(12) United States Patent
Yoneyama

(10) Patent No.: US 9,749,537 B2
(45) Date of Patent: Aug. 29, 2017

(54) IMAGING APPARATUS HAVING CAMERA SHAKE CORRECTION DEVICE

(71) Applicant: OLYMPUS CORPORATION, Hachioji-shi, Tokyo (JP)

(72) Inventor: Hisashi Yoneyama, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 65 days.

(21) Appl. No.: 14/887,899

(22) Filed: Oct. 20, 2015

(65) Prior Publication Data

US 2016/0134814 A1    May 12, 2016

(30) Foreign Application Priority Data

Nov. 11, 2014 (JP) ................. 2014-229036

(51) Int. Cl.
  *H04N 5/232* (2006.01)
(52) U.S. Cl.
  CPC ..... *H04N 5/23287* (2013.01); *H04N 5/23209* (2013.01); *H04N 5/23219* (2013.01); *H04N 5/23238* (2013.01); *H04N 5/23258* (2013.01); *H04N 5/23283* (2013.01); *H04N 5/23293* (2013.01)

(58) Field of Classification Search
  CPC ........... H04N 5/23287; H04N 5/23209; H04N 5/23219; H04N 5/23238; H04N 5/23258
  USPC ..................................... 348/208.11
  See application file for complete search history.

(56) References Cited

U.S. PATENT DOCUMENTS

| 6,785,426 | B1 | 8/2004 | Ishii | |
|---|---|---|---|---|
| 2005/0140793 | A1* | 6/2005 | Kojima | H04N 5/23287 348/208.99 |
| 2011/0007187 | A1* | 1/2011 | Mori | H04N 5/23219 348/239 |

FOREIGN PATENT DOCUMENTS

JP    2001-223942 A    8/2001

* cited by examiner

*Primary Examiner* — Antoinette Spinks
(74) *Attorney, Agent, or Firm* — Volpe and Koenig, P.C.

(57) ABSTRACT

An imaging apparatus includes a first vibration isolation control unit configured to control a first vibration isolation unit that corrects camera shake by moving an imaging element, a second vibration isolation control unit configured to control a second vibration isolation unit that corrects camera shake by moving a lens, and a setting unit configured to conduct setting of which of the first vibration isolation unit and the second vibration isolation unit is to be used for which of the camera shake correction and the moving of the photographic range.

9 Claims, 18 Drawing Sheets

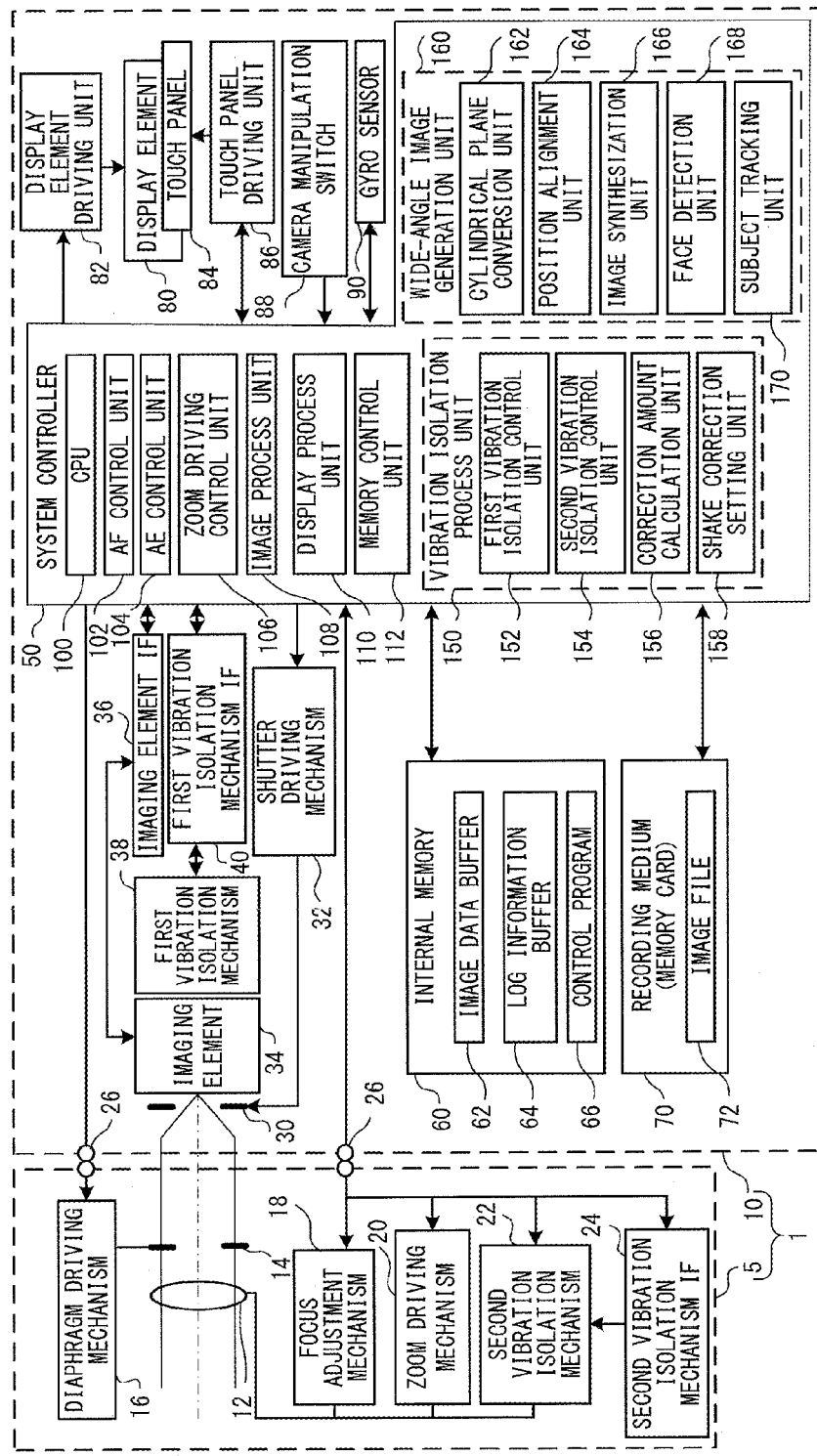
F I G. 1

|  | No. 1 CAMERA SHAKE AMOUNT < CORRECTION PERFORMANCE OF FIRST VIBRATION ISOLATION MECHANISM | No. 2 CORRECTION PERFORMANCE OF FIRST VIBRATION ISOLATION MECHANISM < CAMERA SHAKE AMOUNT < CORRECTION PERFORMANCE OF SECOND VIBRATION ISOLATION MECHANISM | No. 3 CAMERA SHAKE AMOUNT > CORRECTION PERFORMANCE OF SECOND VIBRATION ISOLATION MECHANISM | No. 4 CAMERA SHAKE AMOUNT IS APPROXIMATELY EQUAL TO ZERO |
|---|---|---|---|---|
| FIRST VIBRATION ISOLATION MECHANISM | CAMERA SHAKE CORRECTION | WIDE-ANGLE SHOOTING | CAMERA SHAKE CORRECTION | WIDE-ANGLE SHOOTING |
| SECOND VIBRATION ISOLATION MECHANISM | WIDE-ANGLE SHOOTING | CAMERA SHAKE CORRECTION | CAMERA SHAKE CORRECTION | WIDE-ANGLE SHOOTING |

FIG. 5

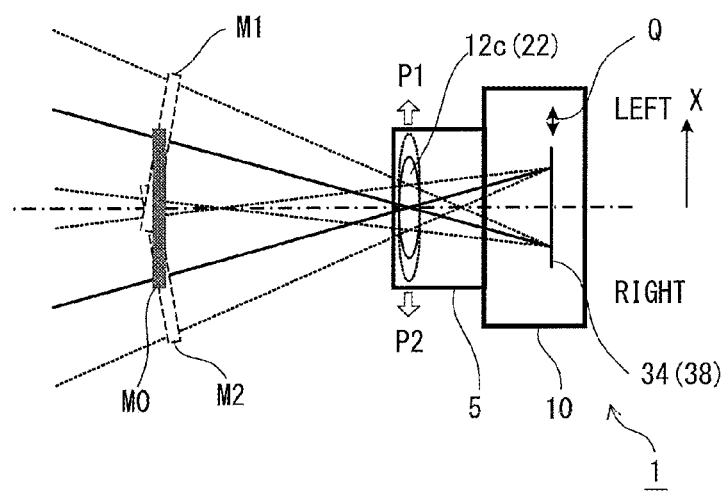
F I G. 6

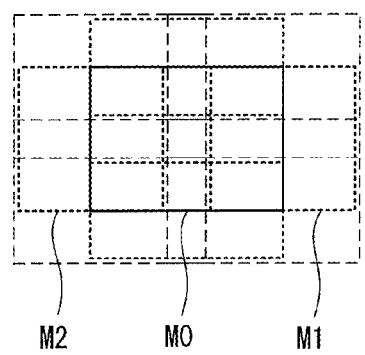 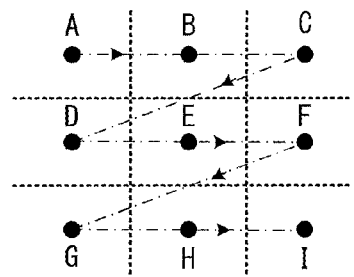
F I G. 7A   F I G. 7B

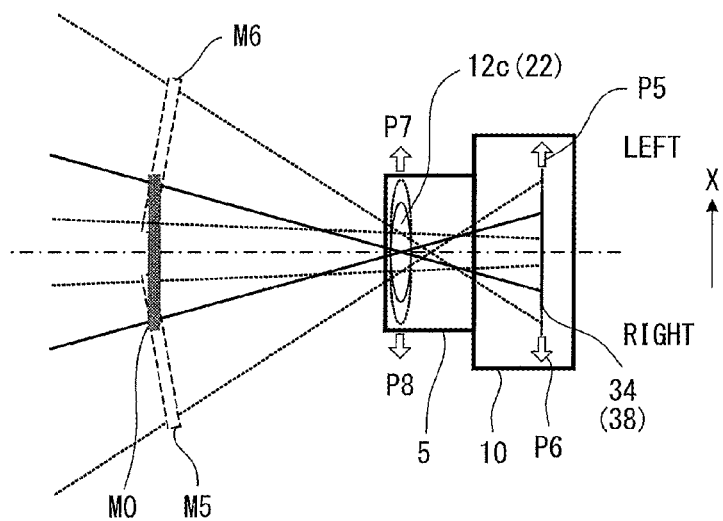
F I G. 9

|  | No. 1 CAMERA SHAKE AMOUNT < CORRECTION PERFORMANCE OF SECOND VIBRATION ISOLATION MECHANISM | No. 2 CAMERA SHAKE AMOUNT > CORRECTION PERFORMANCE OF SECOND VIBRATION ISOLATION MECHANISM | No. 3 CAMERA SHAKE AMOUNT IS APPROXIMATELY EQUAL TO ZERO |
|---|---|---|---|
| FIRST VIBRATION ISOLATION MECHANISM | WIDE-ANGLE SHOOTING | CAMERA SHAKE CORRECTION | WIDE-ANGLE SHOOTING |
| SECOND VIBRATION ISOLATION MECHANISM | CAMERA SHAKE CORRECTION | CAMERA SHAKE CORRECTION | CAMERA SHAKE CORRECTION |

FIG. 11

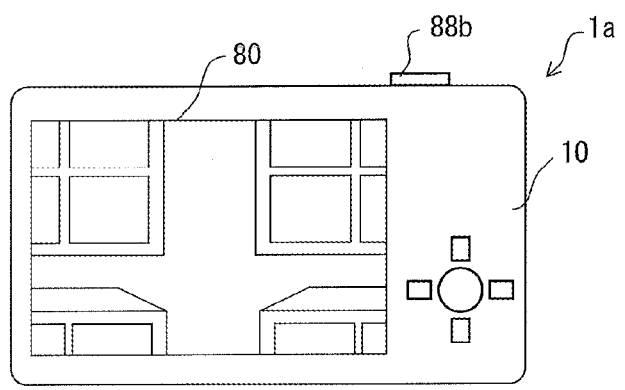
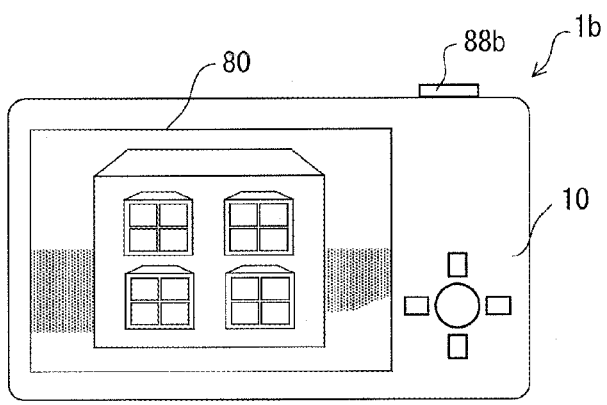
FIG. 13

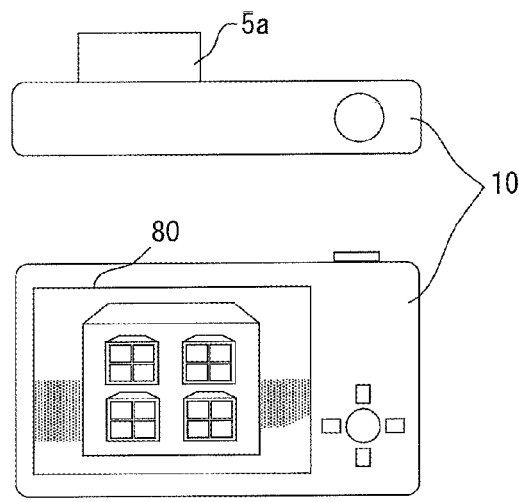
F I G. 14 A
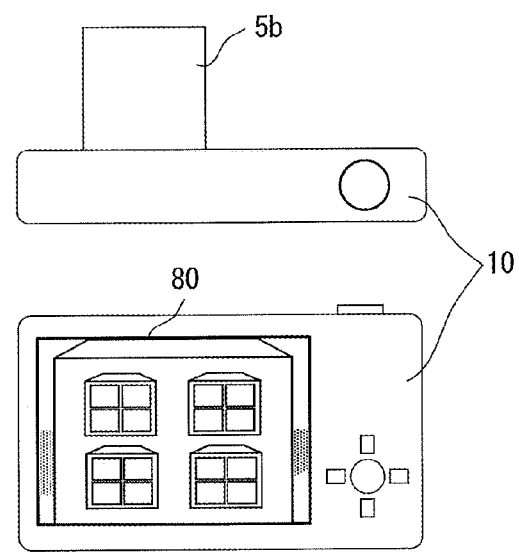
F I G. 14 B

|  | No. 1 MAIN SUBJECT POSITION: WITHIN PHOTOGRAPHIC RANGE a | No. 2 MAIN SUBJECT POSITION: OUT OF PHOTOGRAPHIC RANGE a AND WITHIN PHOTOGRAPHIC RANGE b | No. 3 MAIN SUBJECT POSITION: OUT OF PHOTOGRAPHIC RANGE b |
|---|---|---|---|
| FIRST VIBRATION ISOLATION MECHANISM | WIDE-ANGLE SHOOTING | CAMERA SHAKE CORRECTION | WIDE-ANGLE SHOOTING |
| SECOND VIBRATION ISOLATION MECHANISM | CAMERA SHAKE CORRECTION | WIDE-ANGLE SHOOTING | WIDE-ANGLE SHOOTING |

F I G. 1 5

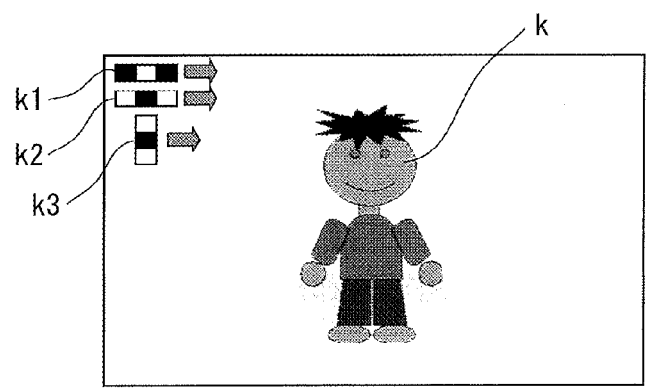
F I G. 1 7 A
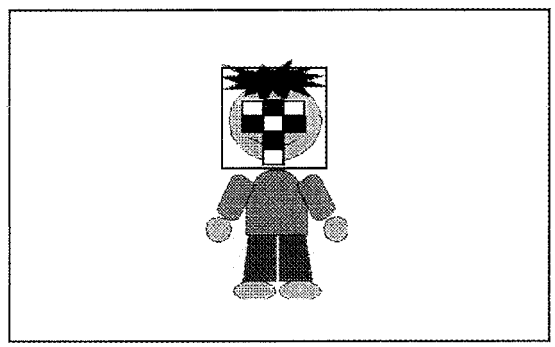
F I G. 1 7 B

IMAGING APPARATUS HAVING CAMERA SHAKE CORRECTION DEVICE

CROSS-REFERENCE TO RELATED APPLICATION

This application is based upon and claims the benefit of priority of the prior Japanese Patent Application No. 2014-229036, filed on Nov. 11, 2014, the entire contents of which are incorporated herein by reference.

BACKGROUND OF THE INVENTION

Field of the Invention

The present invention is related to an imaging apparatus having a camera shake correction mechanism.

Description of the Related Art

Many recent cameras are provided with a camera shake correction mechanism employing the lens shift method or the imager shift method. Both the lens shift method and the imager shift method move the photographic range (shooting direction), and thus a camera that conducts panoramic shooting by using these mechanisms has also been proposed (for example, Japanese Laid-open Patent Publication No. 2001-223942).

SUMMARY OF THE INVENTION

It is possible to configure a camera having two vibration isolation mechanisms by attaching an interchangeable lens provided with in-lens vibration isolation employing the lens shift method to a camera body provided with in-body vibration isolation employing the imager shift method. For a camera having two independent vibration isolation mechanisms, it is necessary to conduct appropriate setting about whether the vibration isolation mechanisms are to be used as a wide-angle shooting function or as a camera shake correction function.

It is an object of the present invention to provide an imaging apparatus that conducts wide-angle shooting for which camera shake has been prevented by using two vibration isolation mechanisms independently.

In order to achieve the above object, an imaging apparatus includes a first vibration isolation control unit configured to control a first vibration isolation unit that corrects camera shake by moving an imaging element, a second vibration isolation control unit configured to control a second vibration isolation unit that corrects camera shake by moving a lens, a wide-angle image generation unit for which a photographic range is moved for wide-angle shooting by at least one of the first vibration isolation control unit and the second vibration isolation control unit and which generates a wide-angle image on the basis of a plurality of images sequentially shot in a moved photographic range, and a setting unit configured to conduct setting of which of the first vibration isolation unit and the second vibration isolation unit is to be used for which of the camera shake correction and the moving of the photographic range.

BRIEF DESCRIPTION OF THE DRAWINGS

FIG. 1 is a functional block diagram showing the entire configuration mainly of the electric system of an imaging apparatus;

FIG. 5 is a table showing specific setting examples for camera shake amounts;

FIG. 6 shows operations of a first vibration isolation mechanism and a second vibration isolation mechanism in No. 1 in FIG. 5;

FIG. 7A shows changes of a photographic range accompanying movement of a camera shake correction lens;

FIG. 7B shows an order of changes of a photographic range accompanying movement of a camera shake correction lens;

FIG. 9 shows operations of the first vibration isolation mechanism and the second vibration isolation mechanism in No. 4 shown in FIG. 5;

FIG. 11 shows an example in which the wide-angle shooting function is not supported by an interchangeable lens;

FIG. 13 shows comparison between a live view in normal shooting and a live view in wide-angle shooting;

FIG. 14A shows an image shot by an interchangeable lens 5a that is of a short focus type;

FIG. 14B shows an image shot by an interchangeable lens 5b that is of a long focus type;

FIG. 15 is a table showing the functions set for the first vibration isolation mechanism and the second vibration isolation mechanism corresponding to the main subject position according to a second embodiment;

FIG. 17A shows examples of face parts k1, k2 and k3 according to the second embodiment;

FIG. 17B shows an example of arranging the face parts according to the second embodiment;

DETAILED DESCRIPTION OF THE PREFERRED EMBODIMENTS

Figure 2:
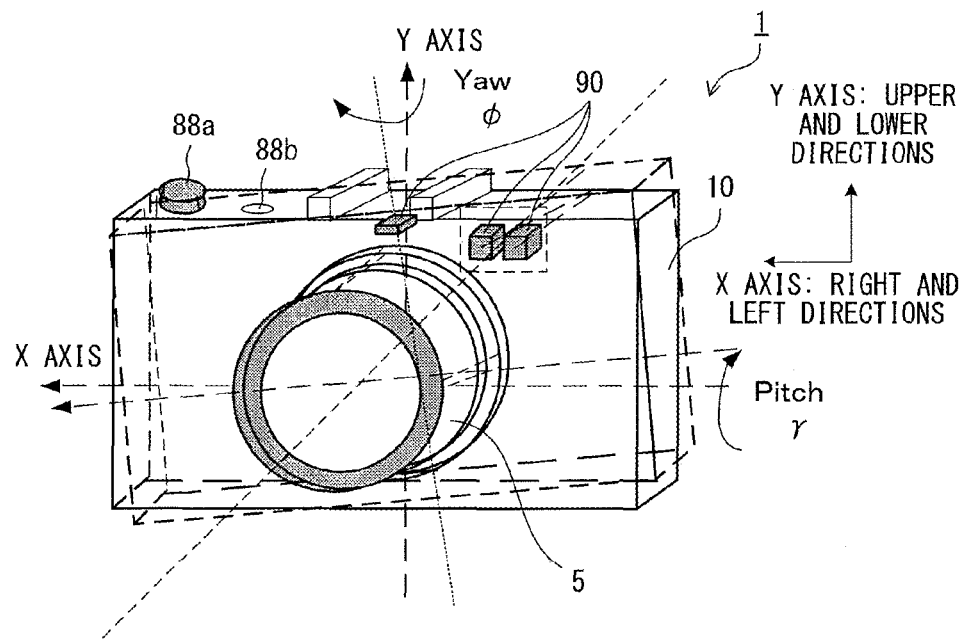
FIG. 2 shows relationships between the imaging apparatus and the directions of camera shake occurring in the imaging apparatus.

Hereinafter, explanations will be given for the embodiments of the present invention by referring to the drawings. An imaging apparatus (digital camera) 1 according to an embodiment is an interchangeable lens camera, and the interchangeable lens (lens mirror frame) and the camera body each have vibration isolation mechanisms. Note that an imaging apparatus 1 according to the present invention is not limited to an interchangeable lens camera, and may be a built-in lens camera.

FIG. 1 is a functional block diagram showing the entire configuration mainly of the electric system of the imaging apparatus 1. The imaging apparatus 1 includes an interchangeable lens 5 and a camera body 10, and the interchangeable lens 5 and the camera body 10 are electrically connected to each other via a communication contact 26.

The interchangeable lens 5 is provided with a lens unit 12, a diaphragm 14, a diaphragm driving mechanism 16, a focus adjustment mechanism 18, a zoom driving mechanism. 20, a second vibration isolation mechanism 22, a second vibration isolation mechanism IF (interface) 24, etc. The lens unit 12 includes a plurality of lens including a focus adjustment lens 12a, a focal length adjustment lens 12b and a camera shake correction lens 12c, although they are not shown.

The camera shake correction lens 12c is supported by a moving mechanism included in the second vibration isolation mechanism 22 so that the camera shake correction lens 12c can move freely in the right and left directions (X axis) and the upper and lower directions (Y axis) in the plane orthogonal to the shooting optical axis. The right and left directions (X axis) and the upper and lower directions (Y axis) are explained in FIG. 2. The diaphragm 14 adjusts the aperture size so as to control the amount of light. The diaphragm driving mechanism 16 includes a motor or a solenoid, and drives the diaphragm 14 so that a prescribed aperture value is attained.

The focus adjustment mechanism 18 has a movement mechanism that moves a driving unit such as a motor etc. and the focus adjustment lens 12a in the optical axis directions so as to adjust the point of focus. The zoom driving mechanism 20 has a movement mechanism that moves a driving unit such as a motor etc. and the focal length adjustment lens 12b in the optical axis directions so as to adjust the focal length in order to change the angle of field.

A second vibration isolation mechanism. 22 has a movement mechanism that realizes movement of the camera shake correction lens 12c in the plane orthogonal to the shooting optical axis and an actuator including a voice coil motor (VCM), a stepping motor, etc. that moves the camera shake correction lens 12c. The camera shake correction lens 12c is moved (shifted) in a direction in which camera shake is cancelled when camera shake has occurred in the imaging apparatus 1 (angular shake and shifting shake). The second vibration isolation mechanism IF 24 receives a control instruction from the camera body 10 so as to report a control signal to the second vibration isolation mechanism 22. The combination of the camera shake correction lens 12c and the second vibration isolation mechanism 22 is also referred to as a second vibration isolation unit.

Note that it is also possible to employ a configuration in which a CPU for controlling a lens is included in the interchangeable lens 5 so that the CPU for controlling a lens communicates with the camera body 10 in order to control the diaphragm driving mechanism 16, the focus adjustment mechanism 18, the zoom driving mechanism 20, the second vibration isolation mechanism 22, the second vibration isolation mechanism IF 24, etc.

The camera body 10 has a shutter 30, a shutter driving mechanism 32, an imaging element 34, an imaging element IF (interface) 36, a first vibration isolation mechanism 38 and a first vibration isolation mechanism IF (interface) 40.

The shutter 30 is positioned in front of the imaging element 34 so as to adjust the period of time during which the imaging element 34 is exposed to the light from the subject. The shutter driving mechanism 32 has a driving mechanism for driving the shutter 30.

The imaging element 34 conducts photoelectric conversion on the subject image formed via the lens unit 12 so as to output the image signal. The imaging element IF 36 has a driver circuit (not shown) for driving the imaging element 34 and an AGC (auto gain control) process for adjusting gain of the image signal output from the imaging element 34, and also has an AD process unit so as to output digital image data.

The first vibration isolation mechanism 38 is a driving mechanism that moves (shifts) the imaging element 34 along the imaging plane. The imaging element 34 is supported by a movable supporting member (not shown) and is freely movable in the right and left directions (X axis) and upper and lower directions (Y axis) in the imaging plane. The first vibration isolation mechanism 38 drives the movable supporting member for holding the imaging element 34 in the X axis directions and the Y axis directions in accordance with a camera shake correction signal. The combination of the imaging element 34 and the first vibration isolation mechanism 38 is also referred to as a first vibration isolation unit.

The first vibration isolation mechanism IF 40 instructs the first vibration isolation mechanism 38 to correct the detected camera shake amount by specifying the movement direction and the movement distance along the X axis or the Y axis.

The camera body 10 includes a system controller 50, an internal memory 60, a recording medium 70, a display element 80, a display element driving unit 82, a touch panel 84, a touch panel driving unit 86, a camera manipulation switch 88 and gyro sensors 90.

The system controller 50 controls the imaging apparatus 1 entirely. The system controller 50 has a CPU 100, and executes respective processes through a software process executed by the CPU 100 that has read a control program 66 stored in the internal memory 60.

The internal memory 60 includes a DRAM or a ROM. The DRAM is used as an image data buffer 62, which is a working memory for storing image data temporarily or as a log information buffer 64 for storing various types of elapse information. The ROM is a non-volatile memory such as for example a flash ROM, and stores various types of tables and a control program for controlling the imaging apparatus 1.

The recording medium 70 is a memory that is detachable from the camera body 10, and is for example a memory card for recording an image file 72. The display element 80 is a back surface display unit provided on the back surface of the camera body 10. It is also possible to employ a configuration in which the display element 80 is a display unit of a finder type provided to the upper portion of the camera body 10. The display element 80 is of a LCD or organic EL, and displays a live view image, a shot-image image, a menu window, etc. The display element driving unit 82 is a driver circuit that drives the display element 80.

The touch panel 84 is an input unit for accepting input such as changing between various shooting conditions, switching of images to be displayed, etc. The touch panel 84 is integrated with the display element 80 and is provided to the back surface of the camera body 10. The touch panel driving unit 86 is a driver circuit that drives the touch panel 84.

The camera manipulation switch 88 is an input button or a dial provided to the camera body 10. Examples of the camera manipulation switch 88 include a power button or a release button. The gyro sensors 90 detect vibrations caused in the camera body 10 by camera shake etc. so as to output a camera shake signal. The gyro sensor 90 is for example an acceleration sensor, an angular acceleration sensor, etc.

Also, the system controller 50 has an AF control unit 102, an AE control unit 104, a zoom driving control unit 106, an image process unit 108, a display process unit 110, a memory control unit 112, a vibration isolation process unit 150, a wide-angle image generation unit 160, etc. as function units executed by the CPU 100.

The AF control unit 102 detects the focal position from for example the contrast of a shot image in order to control the focus adjustment mechanism 18 so that the focus adjustment lens 12a is moved to the detected focal position. The AE control unit 104 controls the diaphragm driving mechanism 16 and the shutter driving mechanism 32 by measuring the subject luminance from a shot image and setting the shutter speed, the aperture value and the ISO sensitivity.

The zoom driving control unit 106 controls the zoom driving mechanism 20 in accordance with an instruction from the zoom button so that the focal length adjustment lens 12b moves to the position of a prescribed magnification. The image process unit 108 conducts various processes such as AWB (auto white balance), an interpolation process, a compression process, etc. on image data output from the imaging element IF 36, and also expands image data read in a compressed state from the image file 72.

For shooting, the display process unit 110 converts image data output from the image process unit 108 into an live view image to be displayed by the display element 80, and outputs the data after the conversion to the display element driving unit 82. For reviewing, the display process unit 110 converts recorded image that has been expanded from the image file 72 of the recording medium 70 into an image to be displayed, and outputs the image to the display element driving unit 82.

For shooting, the memory control unit 112 records image data having received a compression process in the image process unit 108 in the recording medium 70 as the image file 72. For reviewing, the memory control unit 112 reads a specified image data from the image file 72.

The vibration isolation process unit 150 detects the amount and the direction of camera shake occurring in the camera body 10, calculates the camera shake correction amount for cancelling the camera shake and controls the first vibration isolation mechanism 38 and/or the second vibration isolation mechanism 22. Further, when the shooting mode has been set to the wide-angle shooting mode, the vibration isolation process unit 150 controls the first vibration isolation mechanism 38 and/or the second vibration isolation mechanism. 22 so that the photographic range is changed sequentially.

In the wide-angle shooting mode, the vibration isolation process unit 150 sets which of the first vibration isolation mechanism 38 and the second vibration isolation mechanism 22 is to be used for which of the camera shake correction and the wide-angle shooting in accordance with the camera shake amount. Further, the vibration isolation process unit 150 changes the range of the wide-angle image in accordance with the position or the movement of the main subject in the screen. This point will be explained in the second embodiment.

Specifically, the vibration isolation process unit 150 has a first vibration isolation control unit 152, a second vibration isolation control unit 154, a correction amount calculation unit 156, a shake correction setting unit 158, etc. The first vibration isolation control unit 152 controls the first vibration isolation mechanism 38 so that it moves in accordance with the camera shake correction amount for camera shake correction and so that photographic range moves to a set range (direction) for wide-angle shooting, respectively.

Similarly to the first vibration isolation control unit 152, the second vibration isolation control unit 154 also controls the second vibration isolation mechanism 22 so that the photographic range moves in accordance with the camera shake correction amount for camera shake correction and so that photographic range moves to a set range (direction) for wide-angle shooting, respectively.

The correction amount calculation unit 156 calculates the camera shake correction amount in such a manner that the camera shake detected by the gyro sensors 90 is cancelled. When the first vibration isolation mechanism 38 or the second vibration isolation mechanism 22 alone corrects camera shake, the correction amount calculation unit 156 calculates the camera shake correction amount for each of them, and when both the first vibration isolation mechanism 38 and the second vibration isolation mechanism 22 correct camera shake, the correction amount calculation unit 156 calculates correction amounts assigned to the first vibration isolation mechanism 38 and the second vibration isolation mechanism 22.

In a normal shooting mode, in which the wide-angle shooting mode is not set, the shake correction setting unit 158 sets, as the correction mechanism, a correction mechanism capable of correcting the camera shake that has occurred selecting from among the two correction mechanisms. In other words, the shake correction setting unit 158 sets, as the correction mechanism, the vibration isolation mechanism having a maximum correction amount greater than the calculated camera shake amount selecting from among the first vibration isolation mechanism 38 and the second vibration isolation mechanism 22.

When both the first vibration isolation mechanism. 38 and the second vibration isolation mechanism 22 can correct the camera shake, the shake correction setting unit 158 sets, as the correction mechanism, the correction mechanism specified by default. When the camera shake amount is greater than the maximum correction amount of each one of the first vibration isolation mechanism 38 and the second vibration isolation mechanism 22, the shake correction setting unit 158 sets, as the camera shake correction mechanism, both the first vibration isolation mechanism 38 and the second vibration isolation mechanism 22.

In the wide-angle shooting mode, the shake correction setting unit 158 sets one of the first vibration isolation mechanism 38 and the second vibration isolation mechanism 22 for the camera shake correction in accordance with the camera shake amount, and sets the other one for the wide-angle shooting. However, when the camera shake amount is large, the shake correction setting unit 158 sets both the first vibration isolation mechanism 38 and the second vibration isolation mechanism 22 for camera shake correction. Also, when the camera shake amount is equal to or smaller than a prescribed amount, the shake correction setting unit 158 sets both the first vibration isolation mechanism 38 and the second vibration isolation mechanism 22 for wide-angle shooting. Specific setting will be explained in FIG. 5. Note that the shake correction setting unit 158 is also referred to as a setting unit.

The system controller 50 synchronizes the movement of the photographic range caused by the vibration isolation process unit 150 and the timing of shooting conducted by the imaging element IF 36, and sequentially repeats the movement of the photographic range caused by the first vibration isolation mechanism 38 or the second vibration isolation mechanism 22 and shooting of one frame after the movement.

In the wide-angle shooting mode, the wide-angle image generation unit 160 synthesizes a plurality of images shot sequentially in the photographic range moved by the first vibration isolation mechanism 38 or the second vibration isolation mechanism 22, and generates a wide-angle image.

Specifically, the wide-angle image generation unit 160 includes a cylindrical plane conversion unit 162, a position alignment unit 164, an image synthesization unit 166, a face detection unit 168 and a subject tracking unit 170. The cylindrical plane conversion unit 162 converts respective images into a cylindrical planes when respective shot images receive position alignment and are put together. The position alignment unit 164 aligns the positions of the respective images in order to paste respective images that were converted into cylindrical planes. The image synthesization unit 166 develops respective images having received position alignment on the image data buffer 62 and converts them into one piece of image data.

The face detection unit 168 detects faces by searching for parts of faces in a shot image. The subject tracking unit 170 identifies, by the luminance or the colors, a feature of the main subject specified in the shot image so as to detect the position of the main subject in the screen in each frame, and thereby determines the position and the movement of the main subject.

FIG. 2 shows relationships between the imaging apparatus 1 and the directions of camera shake occurring in the imaging apparatus 1. FIG. 2 is a view of the imaging apparatus 1 seen from the subject side. The imaging apparatus 1 includes the interchangeable lens 5 and the camera body 10, and the interchangeable lens 5 is attached to the front surface of the camera body 10. Note that the vertical direction is defined as the Y axis and the width direction of the imaging apparatus 1 is defined as the X axis by using the normal use orientation of the imaging apparatus 1 as the reference. The Y axis directions are also referred to as the upper and lower directions and the X axis directions are also referred to as the right and left directions. Also, a rotation on the plane orthogonal to the X axis is referred to as a pitch-directional rotation (rotation angle $\gamma$) and a rotation on the plane orthogonal to the Y axis is referred to as a yaw-directional rotation (rotation angle $\phi$).

The camera body 10 is provided with the gyro sensors 90 that detect a pitch-directional rotation and a yaw-directional rotation, respectively. Also, on the left side of the top surface of the camera body 10, a release button 88a and a power button 88b are provided.

Figure 3:
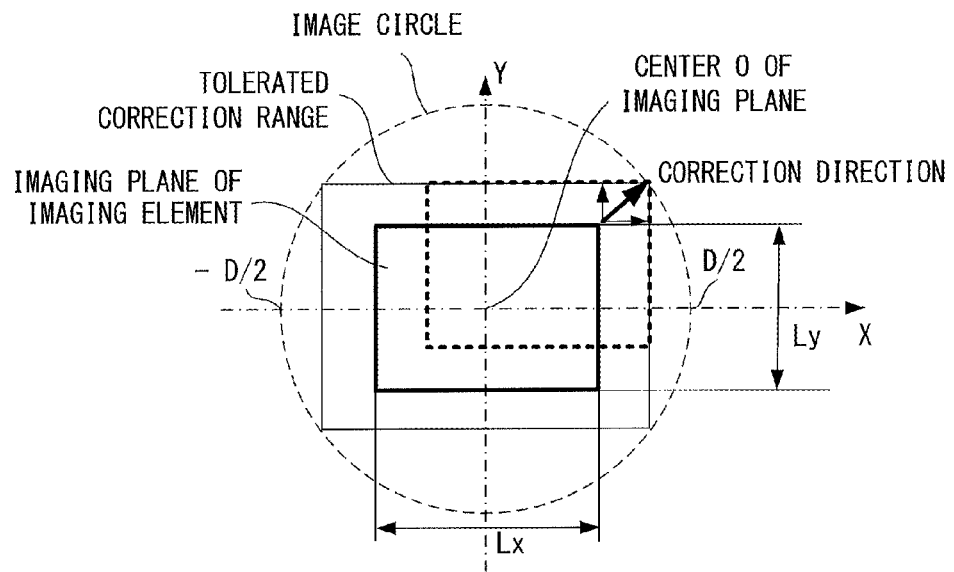
FIG. 3 is a schematic view showing relationships between the imaging plane of an imaging element and the image circle etc.

FIG. 3 is a schematic view showing relationships between the imaging plane of the imaging element 34 and the image circle etc. regarding the first vibration isolation mechanism 38. The imaging plane of the imaging element 34 is a rectangle having the vertical length of Ly and the horizontal length of Lx. The tolerated correction range of the rectangular shape that is in internal contact with the image circle of the lens unit 12 is the maximum range within which the imaging plane of the imaging element 34 can move. The imaging plane of the imaging element 34 represented by a thick solid line is of a case where center O of the imaging plane coincides with the center of the image circle. The imaging plane of the imaging element 34 represented by a dashed line is of a case where the imaging plane has moved to the rightmost and uppermost position. When the imaging element 34 is used for moving the photographic range, it is moved to the maximum position within the tolerated correction range.

First Embodiment

Figure 4:
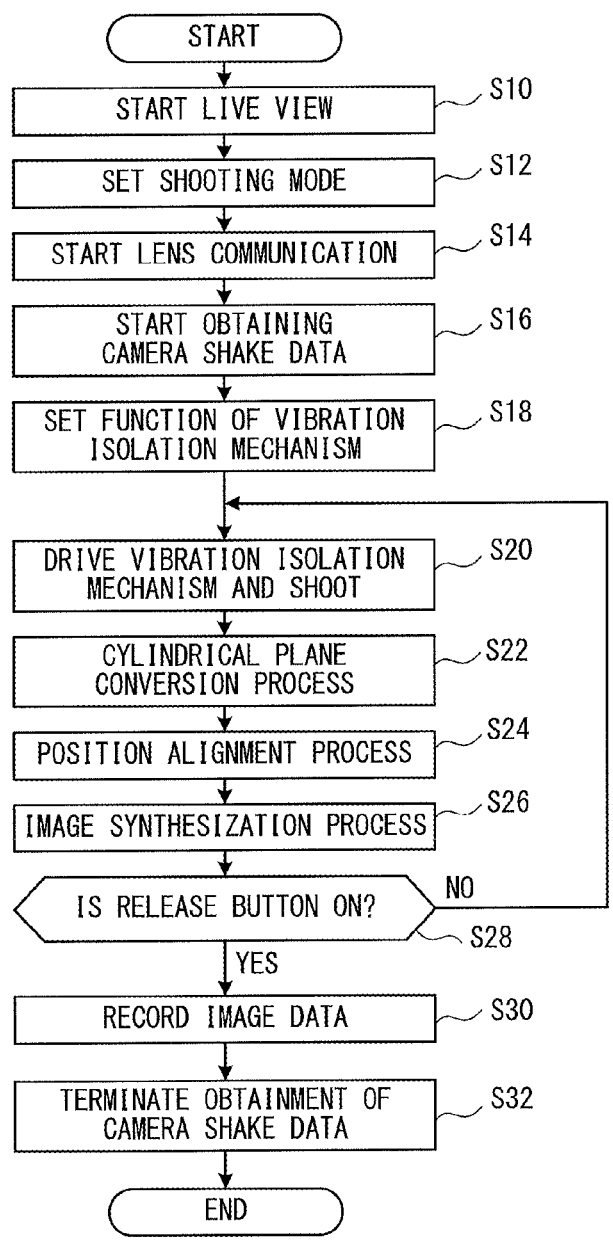
FIG. 4 is a flowchart showing the procedure of a wide-angle shooting process based on movement of a photographic range.

FIG. 4 is a flowchart showing the procedure of a wide-angle shooting process based on movement of the photographic range. The display process unit 110 starts live view (step S10). The system controller 50 sets the shooting mode in accordance with an instruction given to the camera manipulation switch 88 from the user (step S12). It is now assumed that the shooting mode has been set to the wide-angle shooting mode.

The system controller 50 starts a lens communication with the interchangeable lens 5 (step S14).

The correction amount calculation unit 156 starts camera shake data obtainment on the basis of the data of acceleration etc. obtained from the gyro sensors 90 (step S16).

The shake correction setting unit 158 conducts function settings of vibration isolation mechanisms (step S18). The shake correction setting unit 158 compares levels of the camera shake correction performance of the first vibration isolation mechanism 38 and the second vibration isolation mechanism 22 with the detected current camera shake amount so as to set which of the first vibration isolation mechanism 38 and the second vibration isolation mechanism 22 is to be used for which of the camera shake correction and the wide-angle shooting. The camera shake correction performance in this example is assumed to be the maximum amount of the camera shake correction. Also, similarly to the first vibration isolation mechanism 38, the maximum correction amount of camera shake corresponds to the movement distance of the photographic range in the second vibration isolation mechanism 22.

Explanations will now be given for the principle by which the photographic range is moved by the first vibration isolation mechanism 38 and the second vibration isolation mechanism 22 by referring to FIG. 5 through FIG. 10. First, a specific example is shown in FIG. 5. In this example, it is assumed that the camera shake correction performance (maximum correction amount) of the second vibration isolation mechanism 22 is higher than that of the first vibration isolation mechanism 38. In other words, in the wide-angle shooting, the photographic range expanded by the second vibration isolation mechanism 22 is broader than the photographic range expanded by the first vibration isolation mechanism 38.

First, when (camera shake amount<correction performance of the first vibration isolation mechanism 38) is satisfied (No. 1), the first vibration isolation mechanism 38 is set to be used for camera shake correction and the second vibration isolation mechanism 22 is set to be used for wide-angle shooting. Next, when (correction performance of the first vibration isolation mechanism 38<camera shake amount<correction performance of the second vibration isolation mechanism 22) is satisfied (No. 2), the first vibration isolation mechanism 38 is set to be used for wide-angle shooting and the second vibration isolation mechanism 22 is set to be used for camera shake correction.

When (camera shake amount>correction performance of the second vibration isolation mechanism 22) is satisfied (No. 3), both the first vibration isolation mechanism 38 and the second vibration isolation mechanism 22 are set to be used for camera shake correction. Further, when the camera shake amount is equal to or smaller than a prescribed level (the camera shake amount is determined to be so small that camera shake correction is not needed, i.e., the amount is approximately equal to zero) (No. 4), both the first vibration isolation mechanism 38 and the second vibration isolation mechanism 22 are set to be used for the wide-angle shooting. In other words, the setting example shown in FIG. 5 is of a case where higher priority is given to suppressing of camera shake than wide-angle shooting.

FIG. 6 shows operations of the first vibration isolation mechanism 38 and the second vibration isolation mechanism 22 in No. 1 in FIG. 5. FIG. 6 shows the imaging apparatus 1 seen from above. In FIG. 6, the upper side corresponds to the left direction of the imaging apparatus 1, and the lower side corresponds to the right direction of the imaging apparatus 1.

The imaging element 34 is moved by the first vibration isolation mechanism 38 so that camera shake is corrected. The imaging element 34 is moved in the directions Q so that camera shake is cancelled. However, directions Q are not limited to X directions, but are all directions including X directions for cancelling camera shake.

The camera shake correction lens 12c is moved by the second vibration isolation mechanism 22 so that the photographic range is moved for wide-angle shooting. In this example, a case is shown in which the photographic range is moved to the right and left directions. When the camera shake correction lens 12c has been moved in the left direction (P1) by the second vibration isolation mechanism 22, the photographic range is moved in the left direction. M0 represents the photographic range in the normal shooting mode. M1 represents the photographic range in a case when the camera shake correction lens 12c has been moved to the left direction by the maximum distance.

Similarly, when the camera shake correction lens 12c has been moved in direction of P2 by the second vibration isolation mechanism 22, the photographic range is moved in the right direction. M2 represents the photographic range in a case when the camera shake correction lens 12c has been moved to right by the maximum distance.

FIG. 6 shows an example in which the camera shake correction lens 12c is moved to the right and left, however, the principle applies to a case when the camera shake correction lens 12c is moved to upward and downward (Y axis). Specifically, when the camera shake correction lens 12c has been moved in the upper direction, the photographic range moves upward. When the camera shake correction lens 12c is moved in the lower direction, the photographic range moves downward. Further, when the camera shake correction lens 12c is moved in a diagonal direction, the photographic range moves diagonally.

The ranges to be shot by the movement in the upper, lower, right, left and diagonal directions of the camera shake correction lens 12c explained above are shown in FIG. 7A and FIG. 7B. FIG. 7A shows total nine photographic ranges obtained by moving the camera shake correction lens 12c in the upper, lower, right, left and diagonal directions by the maximum distances respectively. Photographic ranges M0, M1 and M2 are the photographic ranges explained in FIG. 6.

Also, FIG. 7B shows an example of a movement order of the photographic range. The camera shake correction lens 12c is moved so that the photographic range is changed in the order of A, B, C, . . . , H and I, and shooting is conducted at each movement position. By synthesizing nine images obtained corresponding to photographic ranges A through I, one wide-angle image can be obtained. The vertical and horizontal dimensions of three by three shown in FIG. 7B is an example and may also be two by two or may also be long only in the horizontal directions such as a so-called a panoramic picture.

Figure 8:
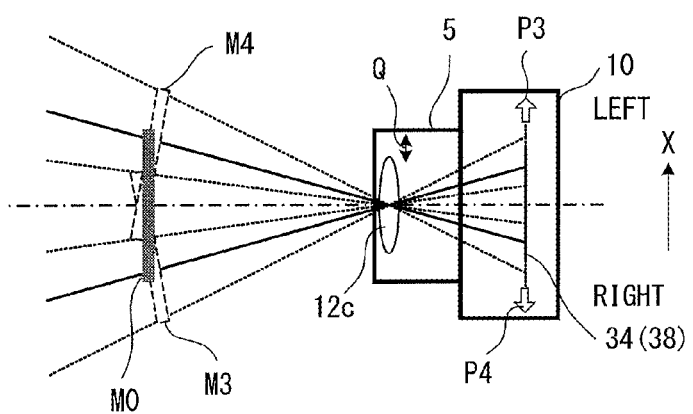
FIG. 8 shows operations of the first vibration isolation mechanism and the second vibration isolation mechanism in No. 2 in FIG. 5.

FIG. 8 shows operations of the first vibration isolation mechanism 38 and the second vibration isolation mechanism 22 in No. 2 in FIG. 5. FIG. 8 is a view in the same direction as in FIG. 6.

The imaging element 34 is moved by the first vibration isolation mechanism 38 and the photographic range is moved (shifted) for wide-angle shooting. When the imaging element 34 has been moved by the first vibration isolation mechanism 38 in the left direction (P3), the photographic range is moved in the right direction. M0 represents a photographic range in the normal shooting mode. M3 represents the photographic range in a case when the imaging element 34 has been moved in the left direction (P3) by the maximum distance.

Similarly, when the imaging element 34 has been moved in the right direction (P4) by the first vibration isolation mechanism 38, the photographic range moves in the left direction. M4 represents the photographic range in a case when the imaging element 34 has been moved in the right direction (P4) by the maximum distance. The principle also applies to a case when the imaging element 34 is moved in the upper or lower directions or in diagonal directions. The overall photographic range that changes in response to the movement of the imaging element 34 is similar to that in FIG. 7B, and explanations thereof will be omitted. Also, the camera shake correction lens 12c is moved by the second vibration isolation mechanism 22 in direction Q so that camera shake is cancelled.

FIG. 9 shows operations of the first vibration isolation mechanism 38 and the second vibration isolation mechanism 22 in No. 4 shown in FIG. 5. No. 4 is an example where both the first vibration isolation mechanism 38 and the second vibration isolation mechanism 22 are used for wide-angle shooting because the camera shake is sufficiently small (approximately equal to zero).

The photographic range in a case when the imaging element 34 has been moved by the first vibration isolation mechanism 38 in the left direction (P5) by the maximum distance and the camera shake correction lens 12c has been moved by the second vibration isolation mechanism 22 in the right direction (P8) by the maximum distance is M5. M5 is on the right side of M2 and M3.

Similarly, the photographic range in a case when the imaging element 34 has been moved by the first vibration isolation mechanism 38 in the right direction (P6) by the maximum distance and the camera shake correction lens 12c has been moved by the second vibration isolation mechanism 22 in the left direction (P7) by the maximum distance is M6. M6 is on the left side of M1 and M4.

Figure 10:
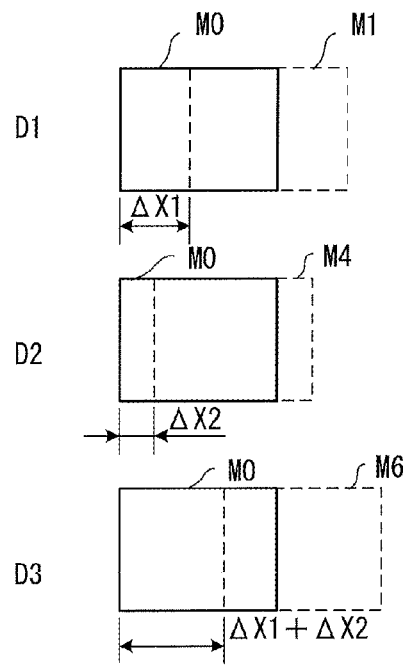
FIG. 10 shows comparison of movement positions of a photographic range.

FIG. 10 shows comparison of movement positions of a photographic range. Comparison example D1 shows a situation where the movement of the camera shake correction lens 12c shown in 6 has moved the photographic range in the right direction (with respect to the orientations in FIG. 10, and this is applied to the following explanations) by ΔX1 so that the photographic range has changed from M0 to M1. Comparison example D2 shows a situation where the movement of the imaging element 34 shown in FIG. 8 has moved the photographic range in the right direction by ΔX2 so that the photographic range has changed from M0 to M4. Comparison example D3 shows a situation where the movement of the camera shake correction lens 12c and the imaging element 34 shown in FIG. 9 has moved the photographic range in the right direction by (ΔX1+ΔX2) so that the photographic range has changed from M0 to M6.

FIG. 4 is explained again. The first vibration isolation control unit 152 and the second vibration isolation control unit 154 drive the respective vibration isolation mechanisms for camera shake correction or for wide-angle shooting in accordance with the setting and conducts shooting (step S20). In the following processes, the settings other than No. 3 were conducted and wide-angle shooting is conducted in one of those settings.

The cylindrical plane conversion unit 162 conducts a cylindrical plane conversion process on shooting data output from the image process unit 108 (9 pieces of image data shown in FIG. 7B for example) (step S22). The position alignment unit 164 conducts a position alignment process on the image data that has received the cylindrical plane conversion process (step S24). The image synthesization unit 166 conducts an image synthesization process on the images that have received the position alignment (step S26) so as to generate one piece of image data. The image data obtained by the synthesization is displayed by the display element 80 as a live view image.

The system controller 50 determines whether or not the release button 88a has been pushed (step S28). When the system controller 50 has determined that the release button 88a has not been pushed (NO in step S28), the process returns to step S20.

When the system controller 50 has determined that the release button 88a has been pushed (YES in step S28), the system controller 50 records synthesized image data based on the wide-angle shooting in the recording medium 70 (step S30). The correction amount calculation unit 156 terminates the obtainment of the camera shake data (step S32). The system controller 50 terminates the process.

Also, combinations between an interchangeable lens and the camera body are not limited to combinations of the same manufacture, and combinations between different manufactures can also be used. There may be a case where even an interchangeable lens having a camera shake correction function is not capable of using the wide-angle shooting function when the combination between the interchangeable lens and the camera body is between different manufactures.

The system controller 50 determines whether or not the interchangeable lens 5 having been attached to the camera body 10 is capable of using the wide-angle shooting function on the basis of the model number etc. reported from the interchangeable lens 5. When the system controller 50 has determined that the attached interchangeable lens 5 is not capable of using the wide-angle shooting function, the shake correction setting unit 158 conducts the setting as shown in FIG. 11. Note that, in this example to, the correction performance of the second vibration isolation mechanism 22 is higher than that of the first vibration isolation mechanism 38 similarly to the example shown in FIG. 5.

First, when (camera shake amount<correction performance of second vibration isolation mechanism 22) is satisfied (No. 1), the first vibration isolation mechanism 38 is set for wide-angle shooting and the second vibration isolation mechanism 22 is set for camera shake correction. Next, when (camera shake amount>correction performance of second vibration isolation mechanism 22) is satisfied (No. 2), both the first vibration isolation mechanism 38 and the second vibration isolation mechanism 22 are set for camera shake correction. Also when the camera shake amount is equal to or smaller than a prescribed level (a level that is determined to be needing no camera shake correction, i.e., the amount is approximately equal to zero) (No. 3), the second vibration isolation mechanism 22 is set for camera shake correction and the first vibration isolation mechanism 38 is set for wide-angle shooting.

Figure 12A:
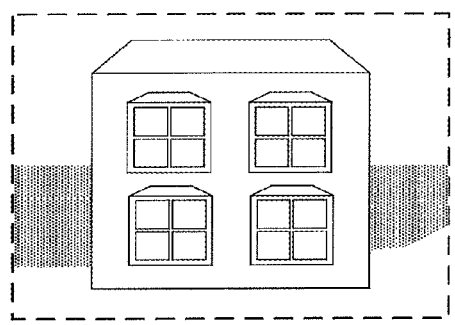
FIG. 12A shows the entire subject that is a target of wide-angle shooting.
Figure 12B:
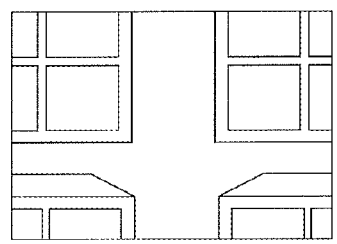
FIG. 12B shows an image of the center portion of FIG. 12A shot in the normal shooting mode.
Figure 12C:
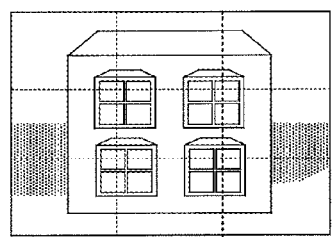
FIG. 12C shows a synthesized image based on a wide-angle shooting and an image obtained by synthesizing nine images.

FIG. 12A, FIG. 12B and FIG. 12C show examples of actual images obtained by wide-angle shooting. FIG. 12A shows the entire subject to be shot. FIG. 12B shows an image of the center portion obtained in the normal shooting mode. FIG. 12C shows a synthesized image based on the wide-angle shooting described above and an image obtained by synthesizing nine images that were obtained in the manner shown in FIG. 7B.

FIG. 13 shows comparison between a live view in normal shooting and a live view in wide-angle shooting. In an imaging apparatus 1a, the image in the normal shooting mode shown in FIG. 12B is displayed by the display element 80 provided on the back surface of the camera body 10. In an imaging apparatus 1b, a synthesized image based on the wide-angle shooting shown in FIG. 12C is displayed by the display element 80 provided on the back surface of the camera body 10.

FIG. 14A and FIG. 14B show a difference in the angle of field caused by focal lengths of interchangeable lenses. FIG. 14A shows an image shot by using an interchangeable lens 5a that is of a short focus type. FIG. 14B shows an image shot by an interchangeable lens 5b that is of a long focus type. Shooting with the interchangeable lens 5a of a short focus type leads to an image of an angle wider than that shot with the interchangeable lens 5b of a long focus type. As described above, it has conventionally been necessary to change the lens to a lens of a short focus type in order to conduct wide-angle shooting.

By conducting wide-angle shooting utilizing the above camera shake correction mechanism, it is possible to obtain a wide-angle image without changing a lens to the interchangeable lens 5a of a short focus type, i.e., by continuing to use the interchangeable lens 5b of a long focus type.

According to the first embodiment described above, the vibration isolation mechanism to be used for wide-angle shooting is selected in accordance with the camera shake amount, making it possible to obtain a wide-angle shooting image for which the camera shake has been corrected. Also, when there is no camera shake, both of the two vibration isolation mechanisms are used for wide-angle shooting, making it possible to obtain an image with wider angle.

Second Embodiment

The second embodiment sets the photographic range so that an identified main subject is included in the screen in the wide-angle shooting explained in the first embodiment.

Figure 16:
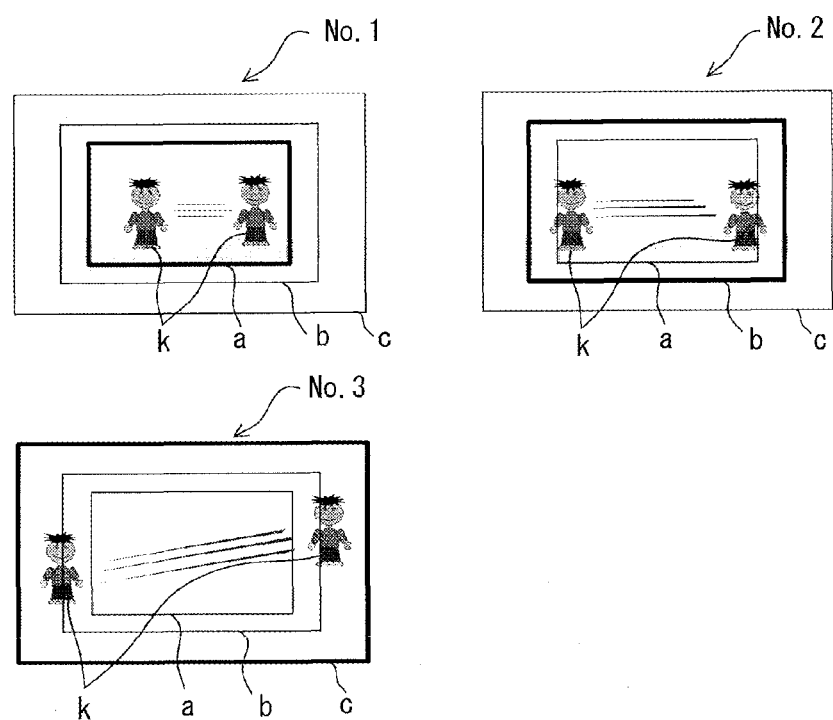
FIG. 16 shows examples of specific situations of No. 1 through No. 3 shown in FIG. 15 according to the second embodiment.

FIG. 15 is a table showing the functions set for the first vibration isolation mechanism 38 and the second vibration isolation mechanism 22 corresponding to the main subject position. The main subject is for example a person at the center of a window. FIG. 16 shows examples of specific situations of No. 1 through No. 3 shown in FIG. 15. Photographic range a in FIG. 16 is a wide-angle photographic range based on the first vibration isolation mechanism 38. Photographic range b is a wide-angle photographic range based on the second vibration isolation mechanism 22. Photographic range c is a wide-angle photographic range based on both the first vibration isolation mechanism 38 and the second vibration isolation mechanism 22. As understood from the views, (a<b<c) is satisfied regarding the sizes of the wide-angle photographic ranges.

The detection of the main subject and the tracking of its position are conducted by the face detection unit 168 and the subject tracking unit 170. FIG. 17A and FIG. 17B show an example of a face detection process. A simple explanation will be given for an example of face detection performed by the face detection unit 168 by referring to FIG. 17A and FIG. 17B.

The face detection unit 168 obtains the image correlation degree between pieces of image data obtained from each frame and face parts k1, k2 and k3 shown in FIG. 17A. Face part k1 is image data corresponding to the pattern of the shades of the portion around the nose of a person, face part k2 is image data corresponding to the pattern of the shades of the portion around the eyes of a person, and face part k3 is image data corresponding to the pattern of the shades of the portion around the mouth of a person.

The face detection unit 168 compares the image data with face parts k1, k2 and k3 so as to obtain the image correlation degree. When the parts of the face of a person have become in a prescribed arrangement that can be recognized as a human face as shown in FIG. 17B, the image correlation degree becomes the maximum. Then, the face detection unit 168 determines that there is a face in the area containing face parts k1, k2 and k3.

Figure 18A:
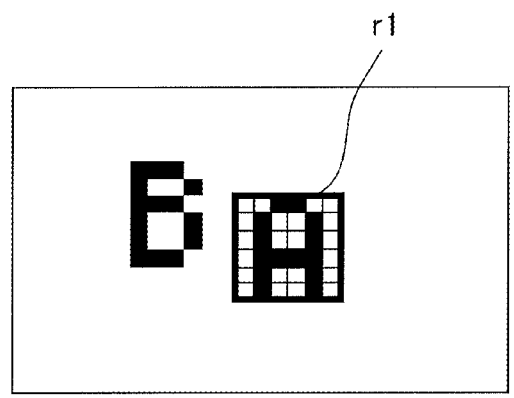
FIG. 18A shows an example of a subject tracking process according to the second embodiment.
Figure 18B:
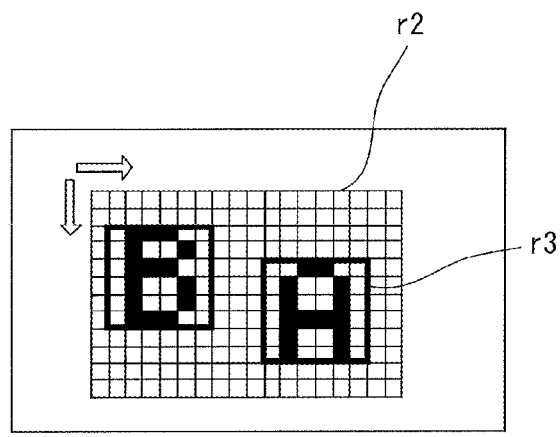
FIG. 18B shows an example of the subject tracking process according to the second embodiment.

FIG. 18A and FIG. 18B show an example of a subject tracking process. A simple explanation will be given for an example of tracking performed by the subject tracking unit 170 by referring to FIG. 18A and FIG. 18B.

The subject tracking unit 170 performs a tracking process that uses the luminance information of the image data. FIG. 18A shows the (N−1)-th frame, and FIG. 18B shows the N-th frame.

In the tracking process that uses the luminance information, when a tracking target has been set in the (N−1)-th frame shown in FIG. 18A, the subject tracking unit 170 stores, as evaluation image data r1, the image data in a prescribed area containing the tracking target in this (N−1)-th frame.

The subject tracking unit 170 searches the N-th frame shown in FIG. 18B for a portion that corresponds to evaluation image data r1. The subject tracking unit 170 searches the N-th frame for a portion that corresponds to evaluation image data r1 by obtaining the image correlation degree between the image data of prescribed tracking area r2 and evaluation image data r1. The subject tracking unit 170 determines that the degree of correspondence is high between area r3 and evaluation image data r1 in the N-the frame so as to determine that the tracking target has moved to area r3.

Again FIG. 15 is referred to. No. 1 shows a case when the main subject is located within photographic range a. As shown in No. 1 in FIG. 16, it is a case when the movement range of main subject k has been determined to be within photographic range a during a prescribed period of time. In such a case, the shake correction setting unit 158 sets the first vibration isolation mechanism 38 for wide-angle shooting, and sets the second vibration isolation mechanism 22 for camera shake correction.

No. 2 shows a case when main subject k is located out of photographic range a and within photographic range b. As shown in No. 2 in FIG. 16, it is a case when the movement range of main subject k has been determined by the subject tracking unit 170 to be out of photographic range a and within photographic range b during a prescribed period of time. In such a case, the shake correction setting unit 158 sets the first vibration isolation mechanism 38 for camera shake correction, and sets the second vibration isolation mechanism 22 for wide-angle shooting.

No. 3 shows a case when main subject k is located out of photographic range b. As shown in No. 3 in FIG. 16, it is a case when the movement range of main subject k has been determined by the subject tracking unit 170 to be out of photographic range b during a prescribed period of time. In such a case, the shake correction setting unit 158 sets both the first vibration isolation mechanism 38 and the second vibration isolation mechanism 22 for wide-angle shooting. Note that a prescribed time during which the movement range of the main subject is determined is for example two seconds. When the determination period is too short, the photographic range is switched too frequently, frustrating the user. When the determination period is too long, the switching of the photographic range is delayed, prolonging a period during which the main subject is not in the screen.

Then, an image shot with the photographic range changing appropriately in accordance with the position of the main subject is displayed by the display element 80 as a live view image.

When a subject that moves over a long distance is to be shot, the conventional technique required the user to pan the imaging apparatus 1 to adjust to the movement of the subject or to conduct manipulations such as changing the zoom ratio etc. Such manipulations were a cause of larger camera shake. According to the second embodiment, the movement of the main subject is detected so that the photographic range is changed in accordance with the movement range of the main subject, making it possible for the user to concentrate on shooting without being forced to make an effort to keep the subject within the screen.

Note that while it was described in the above embodiments that the system controller 50 is realized by a software process performed by a CPU that has read a control program, it is also possible to realize part or the whole of the system controller 50 in a hardware configuration.

The present invention is not limited to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modification and application are possible without departing from the spirit of the present invention.

EXPLANATIONS OF LETTERS OR NUMERALS

1: IMAGING APPARATUS
5: INTERCHANGEABLE LENS
10: CAMERA BODY
12: LENS UNIT
12C: CAMERA SHAKE CORRECTION LENS
22: SECOND VIBRATION ISOLATION MECHANISM
24: SECOND VIBRATION ISOLATION MECHANISM IF
34: IMAGING ELEMENT
36: IMAGING ELEMENT IF
38: FIRST VIBRATION ISOLATION MECHANISM
40: FIRST VIBRATION ISOLATION MECHANISM IF
50: SYSTEM CONTROLLER
80: DISPLAY ELEMENT
88: CAMERA MANIPULATION SWITCH
90: GYRO SENSOR
100: CPU

150: VIBRATION ISOLATION PROCESS UNIT
152: FIRST VIBRATION ISOLATION CONTROL UNIT
154: SECOND VIBRATION ISOLATION CONTROL UNIT
156: CORRECTION AMOUNT CALCULATION UNIT
158: SHAKE CORRECTION SETTING UNIT
160: WIDE-ANGLE IMAGE GENERATION UNIT
162: CYLINDRICAL PLANE CONVERSION UNIT
164: POSITION ALIGNMENT UNIT
166: IMAGE SYNTHESIZATION UNIT
168: FACE DETECTION UNIT
170: SUBJECT TRACKING UNIT

What is claimed is:

1. An imaging apparatus comprising:
a controller comprising:
   a first vibration isolation control section configured to control a first vibration isolation actuator that corrects camera shake by moving an imaging element;
   a second vibration isolation control section configured to control a second vibration isolation actuator that corrects camera shake by moving a lens;
   a wide-angle image generation section for which a photographic range is moved for wide-angle shooting by at least one of the first vibration isolation control section and the second vibration isolation control section and which generates a wide-angle image by combining a plurality of images sequentially shot in a moved photographic range; and
   a setting section configured to conduct setting of which of the first vibration isolation actuator and the second vibration isolation actuator is to be used for which of the camera shake correction and the moving of the photographic range.

2. The imaging apparatus according to claim 1, wherein the setting section sets one of the first vibration isolation actuator and the second vibration isolation actuator to be used for camera shake correction, and sets the other to be used for moving of the photographic range.

3. The imaging apparatus according to claim 2, wherein the controller further comprises:
   a correction amount calculation section configured to calculate a correction amount of camera shake, wherein
   the setting section sets, as a vibration isolation actuator for camera shake correction, a vibration isolation actuator capable of correcting the calculated correction amount of camera shake among the first vibration isolation actuator and the second vibration isolation actuator.

4. The imaging apparatus according to claim 1, wherein the controller further comprises:
   a correction amount calculation section configured to calculate a correction amount of camera shake, wherein
   the setting section sets both the first vibration isolation actuator and the second vibration isolation actuator to be used for moving the photographic range when the calculated correction amount of camera shake is equal to or smaller than a prescribed amount.

5. The imaging apparatus according to claim 1, wherein the controller further comprises:
   a correction amount calculation section configured to calculate a correction amount of camera shake, wherein
   the setting section sets both the first vibration isolation actuator and the second vibration isolation actuator to be used for camera shake correction when the calculated correction amount of camera shake is larger than a camera shake amount that can be corrected by the first vibration isolation actuator alone or the second vibration isolation actuator alone.

6. The imaging apparatus according to claim 1, wherein the setting section sets the second vibration isolation actuator to be used for camera shake correction, and sets the first vibration isolation actuator to be used for camera shake correction or moving of the photographic range.

7. The imaging apparatus according to claim 1, wherein the controller further comprises:
   a display process section configured to display the generated wide-angle image as a live view image.

8. The imaging apparatus according to claim 1, wherein the controller further comprises:
   a face detection section configured to detect a face in an image; and
   a subject tracking section configured to treat the face detected subject as a main subject and to track the main subject, wherein
   the setting section changes a range of the wide-angle shooting by selection of the first vibration isolation actuator and the second vibration isolation actuator on the basis of a position of a tracked main subject.

9. A computer-readable non-transitory storage medium having stored therein a program that causes a computer of an imaging apparatus to execute camera shake correction, wherein
the imaging apparatus includes a first vibration isolation actuator configured to move an imaging element so as to correct camera shake and a second vibration isolation actuator configured to move a lens so as to correct camera shake, and
the program comprises:
   a first vibration isolation control step of controlling the first vibration isolation unit;
   a second vibration isolation control step of controlling the second vibration isolation actuator;
   a step of executing at least one of the first vibration isolation control step and the second vibration isolation control step so as to move a photographic range for wide-angle shooting;
   a wide-angle image generation step of generating a wide-angle image by combining a plurality of images sequentially shot in a moved photographic range; and
   a setting step of conducting setting of which of the first vibration isolation actuator and the second vibration isolation actuator is to be used for which of the camera shake correction and the moving of the photographic range.

* * * * *